United States Patent [19]

Nakamura et al.

[11] Patent Number: 5,550,962
[45] Date of Patent: Aug. 27, 1996

[54] SYSTEM FOR SELECTIVELY PERFORMING PARALLEL OR SEQUENTIAL DRAWING PROCESSING

[75] Inventors: Shouji Nakamura, Yokohama; Shinji Kimura; Yumiko Sugita, both of Sagamihara; Reki Yamamoto, Tokyo; Eriko Koda, Kawasaki; Toshiyuki Kuwana, Hitachi; Masato Manda, Isehara, all of Japan

[73] Assignee: Hitachi, Ltd., Tokyo, Japan

[21] Appl. No.: 419,278

[22] Filed: Apr. 10, 1995

[30] Foreign Application Priority Data

Apr. 13, 1994 [JP] Japan .................................. 6-074631

[51] Int. Cl.⁶ ...................................................... G06T 1/00
[52] U.S. Cl. ........................... 395/133; 395/162; 395/163
[58] Field of Search .................................... 395/133, 135, 395/141, 152, 153, 154, 155, 160, 161, 162, 163, 164, 165, 166

[56] References Cited

U.S. PATENT DOCUMENTS 5,321,808   6/1994   Rupp ..................................... 395/164

OTHER PUBLICATIONS

"The X Window System", ACM Transactions on Graphics, vol. 5, No. 2, pp. 78–109.

"The Multi-Threaded X Server", Proceedings 6-the Annual X Technical Conference, pp. 73–89.

*Primary Examiner*—Almis R. Jankus
*Attorney, Agent, or Firm*—Antonelli, Terry, Stout & Kraus

[57] ABSTRACT

A distributed drawing processing system which includes a drawing server for integratedly executing a string of drawing commands transmitted from a client program for graphics display. In the system, the client program divides the drawing command string into a drawing command block of a string of drawing commands processable on a parallel basis and a drawing command block of a string of drawing commands not processable on the parallel basis, and transmits the divided drawing command string blocks to the drawing server. The drawing server executes the drawing command string while judging whether to process it on the parallel or sequential basis with respect to each of the divided drawing command string blocks.

15 Claims, 13 Drawing Sheets

501 DRAWING COMMAND SEQUENCE EXAMPLE 2

FIG. 6

(PROGRAM EXAMPLE)     (PROCESSING CONTENTS)

CONCURRENT BEGIN ( ) ;     GENERATES THE PARALLEL PROCESSING BLOCK START COMMAND 1 402

DRAW LINE (COORDINATE 1, COORDINATE 2) ;     GENERATES THE DRAWING COMMAND GROUP 1 403

..

DRAW LINE (COORDINATE 1, COORDINATE 2) ;

CONCURRENT END ( ) ;     GENERATES THE PARALLEL PROCESSING BLOCK END COMMAND 1 404

CONCURRENT BEGIN ( ) ;     GENERATES THE PARALLEL PROCESSING BLOCK START COMMAND 2 405

DRAW CIRCLE (CENTRAL COORDINATE, RADIUS) ;     GENERATES THE DRAWING COMMAND GROUP 2 406

..

DRAW LINE (COORDINATE 1, COORDINATE 2) ;

CONCURRENT END ( ) ;     GENERATES THE PARALLEL PROCESSING BLOCK END COMMAND 2 407

FIG. 7

| (PROGRAM EXAMPLE) | (PROCESSING CONTENTS) |
|---|---|
| DRAW LINE (COORDINATE 1. COORDINATE 2); | GENERATES THE DRAWING COMMAND GROUP 0 502 |
| CONCURRENT BEGIN( ); | GENERATES THE PARALLEL PROCESSING BLOCK START 1 402 |
| DRAW LINE (COORDINATE 1. COORDINATE 2); | GENERATES THE DRAWING COMMAND GROUP 1 403 |
| ⋮ | ⋮ |
| DRAW LINE (COORDINATE 1. COORDINATE 2); | |
| CONCURRENT END( ); | GENERATES THE PARALLEL PROCESSING END COMMAND 1 404 |
| CONCURRENT BEGIN( ); | GENERATES THE PARALLEL PROCESSING BLOCK START COMMAND 2 406 |
| DRAW LINE (COORDINATE 1. COORDINATE 2); | GENERATES THE DRAWING COMMAND GROUP 2 406 |
| ⋮ | ⋮ |
| DRAW LINE (COORDINATE 1. COORDINATE 2); | |
| SEQUENTIAL BEGIN( ); | GENERATES THE SEQUENTIAL PROCESSING BLOCK START COMMAND 1 503 |
| SET LINE COLOR (RED); | GENERATES THE DRAWING COMMAND GROUP 3 504 |
| SET LINE WIDTH (2); | ⋮ |
| DRAW CIRCLE (CENTRAL COORDINATE, RADIUOS); | |
| SEQUENTIAL END ( ); | GENERATES THE SEQUENTIAL PROCESSING BLOCK END COMMAND 1 505 |
| SEQUENTIAL BEGIN( ); | GENERATES THE SEQUENTIAL PROCESSING BLOCK START COMMAND 2 506 |
| SET LINE COLOR (GREEN); | GENERATES THE DRAWING COMMAND GROUP 4 507 |
| SET LINE WIDTH (3); | ⋮ |
| DRAW CIRCLE (CENTRAL COORDINATE, RADIUS); | |
| SEQUENTIAL END ( ); | GENERATES THE SEQUENTIAL PROCESSING BLOCK END COMMAND 2 508 |
| CONCURRENT END ( ); | GENERATES THE PARALLEL PROCESSING BLOCK END COMMAND 2 407 |

SYSTEM FOR SELECTIVELY PERFORMING PARALLEL OR SEQUENTIAL DRAWING PROCESSING

BACKGROUND OF THE INVENTION

The present invention relates to a drawing processing system and more particularly, to a parallel drawing processing technique which allows a server program to be built on a multiprocessor system within a drawing server in a drawing processing system wherein drawing instructions are transmitted from at least one client program to the drawing server for integrated execution of drawing processing for the purpose of its graphics display.

Known as a distributed drawing system is such an X window system as disclosed in an article entitled "The X Window System" in an ACM Transactions on Graphics, Vol. 5, No. 2, pp. 78–109.

The known X window system, which is equipped with a drawing server for integratedly executing drawing processing of a single display screen, is a distributed drawing processing system in which drawing instructions for the display screen are transmitted from a display client program (which will be referred to as the client, hereinafter) to the drawing server for graphics display.

In the X window system, when the single drawing server is connected to a plurality of clients, independent application programs can be utilized on the single display screen at the same time. When attention is paid on one of the clients, further, the drawing instructions from the client are sequentially processed in its arrival order within the drawing server, which ensures the consistency of the graphics display.

The drawing server of the X window system has a problem that the drawing server is operated as a single thread so that, when one client transmits a large load of drawing instruction to the drawing server, the drawing server is occupied by the processing of the single client, resulting in reduction of system response.

For solving the above problem, there is suggested such a system as described in an article entitled "The Multi-Threaded X Server" of Processings, 6th Annual X Technical Conference, pp. 73–89.

In this system, when a plurality of clients are connected to a single drawing server, exclusive drawing threads are allocated to the respective clients within the drawing server so that the drawing server can process the drawing instructions of the different clients in a parallel manner.

According to this system, since the independent drawing thread is operated for each of the clients, even when one client transmits a large load of instruction to the drawing server, it can be avoided that the drawing server is occupied by the single client and excludes the other clients.

One of features of the X window system is that a communication path is established as a message stream having its sequence kept.

However, any of these known display systems has had a problem that the drawing server cannot parallelly execute the drawing commands received from the clients of application programs but executes the commands sequentially, with the result of the fact that these systems have a limit in their higher speed processing.

The latter known display system also has another problem that, though the system can perform parallel processing over drawing instructions received from different clients, the system cannot parallelly process drawing instructions received from the same client, so that, when the drawing server is built in a multiprocessor, it is difficult for the drawing server to process the drawing instructions from the single client at a high speed.

SUMMARY OF THE INVENTION

It is accordingly an object of the present invention to provide a drawing processing system in which a drawing server can perform parallel processing operation over drawing commands received from an identical client program.

In the aforementioned known display systems, the drawing server cannot perform parallel processing operation over drawing instructions received from an identical client. This is because, when drawing commands are parallelly executed and displayed by a plurality of processors within the drawing server to enhance its performance, the execution of one of the drawing commands preceding the execution of another drawing command causes generation of an incorrect display.

Explanation will then be made as to how to generate such an incorrect display caused by the above-mentioned execution precedence when drawing commands are executed by the plurality of processors by referring to FIG. 13.

In the drawing, it is desired for a drawing server to draw a blue square 12 on a large red circle 11 on a display screen 10.

As in these known systems, when it is desired for the drawing server to sequentially execute drawing commands for display, a drawing command for drawing the red circle 11 is first inputted to the drawing server and then a drawing command for drawing the blue square 12 is inputted thereto. Since the drawing server sequentially executes these drawing commands and displays them, these figures can be drawn without any trouble.

Meanwhile, in the case where it is desired for a plurality of processors within a drawing server to parallelly execute and display drawing commands, if the drawing server starts drawing the blue square 12 during drawing of the red circle 11, then there occurs a possibility that the execution of the drawing command for drawing of the blue square 12 overtakes (is carried out earlier than) the execution of the drawing command for drawing of the red circle 11 in zones 13 and 14 over-lapped with the both each other, which means that the blue square 12 is first drawn and thereafter the large red circle 11 is drawn. In this case, the blue square 12 disadvantageously fails to remain on the display screen 10.

In accordance with an aspect of the present invention, there is provided a distributed drawing processing system which includes a drawing server for integratedly executing a string of drawing commands transmitted from a client program for graphics display, and wherein the client program includes an execution control means for dividing the drawing command string into a drawing command block of a string of drawing commands processable on a parallel basis and a drawing command block of a string of drawing commands not processable on the parallel basis and for transmitting the divided drawing command string blocks to the drawing server, and the drawing server includes an execution control determination means for executing the drawing command string on a block basis of the divided drawing command string blocks.

The divided drawing command string blocks are transmitted to the drawing server through a communication path. The drawing server analyzes the drawing command strings of the blocks specified by the client program, determines execution and synchronous control of the drawing command strings, and executes the drawing command string of the parallel processing block, whereby the system can process the drawing command string from the client program at a high speed.

That is, in the present invention, since drawing commands are divided into a block of a string of commands processable on the parallel basis and a block of a string of command not processable on the parallel basis, the drawing server can judge a quick and reliable way of allocating the drawing commands to a plurality of threads.

Therefore, the drawing server can be built in a multiprocessor to perform parallel processing over commands in the parallel processing block and thus can process drawing commands from the client program at a high speed.

BRIEF DESCRIPTION OF THE DRAWINGS

FIG. 6 shows an example of a program for generating the drawing command sequence of FIG. 4;

FIG. 7 shows an example of a program for generating the drawing command sequence of FIG. 5;

DESCRIPTION OF THE PREFERRED EMBODIMENTS

Figure 1:
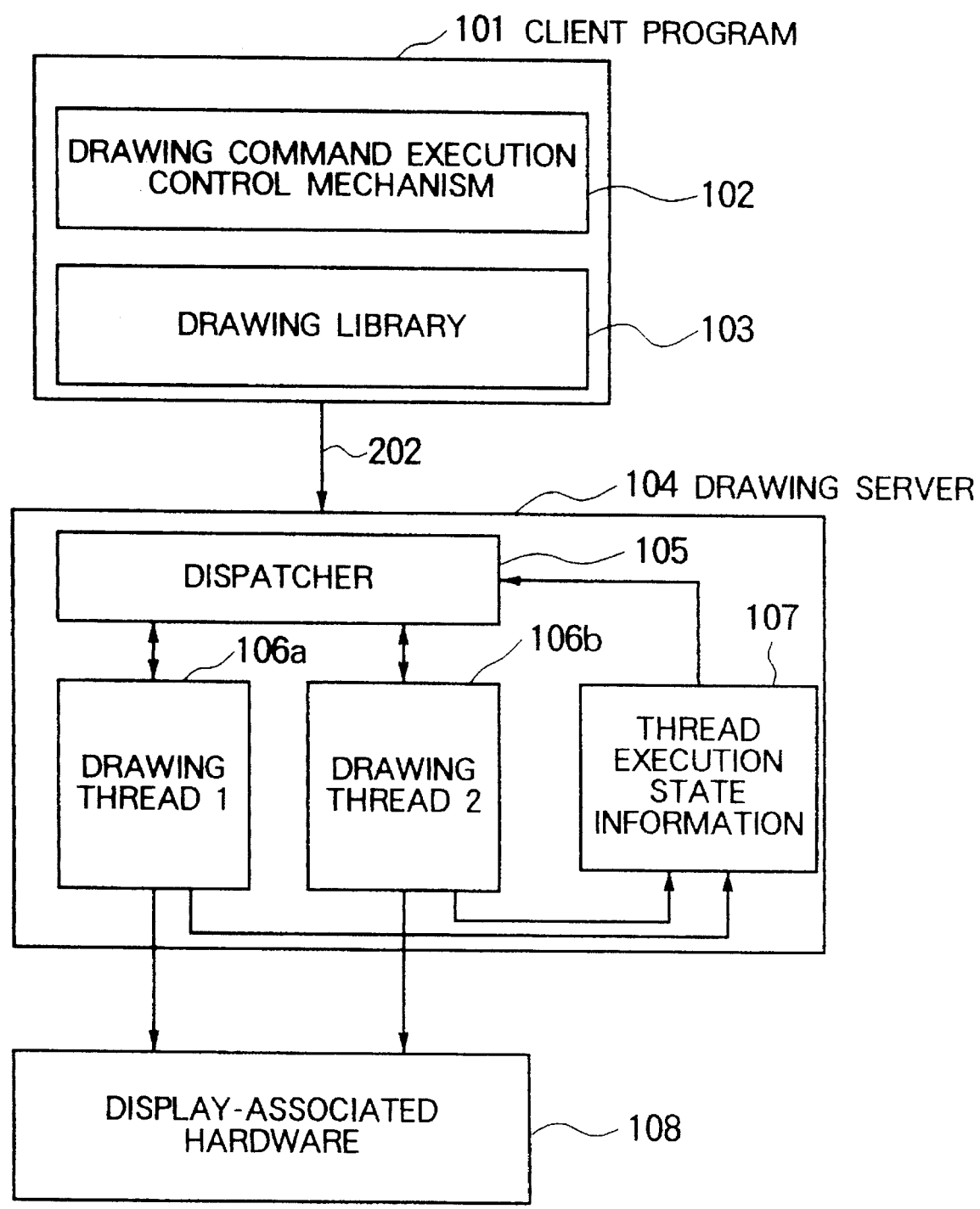
FIG. 1 is a schematic block diagram for explaining a drawing processing system in accordance with the present invention.

An embodiment of the present invention will be detailed with reference to the attached drawings, in which parts having the same functions are denoted by the same reference numerals to avoid repetitive explanation.

Referring first to FIG. 1, there is shown a block diagram for explaining a general drawing processing system in accordance with the present invention, which includes a client program 101, a drawing command execution control mechanism 102, a drawing library 103, a drawing server 104, a dispatcher 105, drawing threads 106a and 106b, thread execution state information 107, and display-associated hardware 108.

The client program (which will be referred to as the client, hereinafter) 101 for issuing a drawing command to ask for its display includes the drawing library 103 for transmitting drawing commands for characters, figures, graphics, etc. therefrom to the drawing server, and the drawing command execution control mechanism 102 for transmitting to the drawing server an execution control instruction for specifying a parallel processing block indicative of a string of instructions parallelly executable and a sequential processing block indicative of a string of instruction sequentially executable.

The drawing server 104 for processing a drawing request received from the client program 101 includes the dispatcher 105 for reading out and interpreting a drawing command from the client program 101 via a communication path 202 according to a protocol and for calling the associated drawing processing part (thread), the drawing threads 106a and 106b for executing the drawing processing, and the thread execution state information 107 indicative of whether the drawing threads 106a and 106b are in their execution or idle state.

The thread execution state information 107 is expressed in the form of a table showing a relationship between the drawing threads 106a and 106b and the execution or idle state thereof.

Explanation will next be made as to a flow of the drawing operation in FIG. 1. The client program 101 calls the drawing command execution control mechanism 102 and the drawing library 103 and asks the drawing server 104 to draw a graphics display. In response to the display request from the client program 101, the dispatcher 105 of the drawing server 104 interprets the drawing command received from the client program 101 and finds one of the drawing threads 106a and 106b which is in its idle state on the basis of the thread execution state information 107. After setting data of the thread execution state information 107 associated with the corresponding thread 106a or 106b at its execution state, the dispatcher 105 initiates the thread (106a or 106b) to execute the drawing command.

The initiated drawing thread 106a or 106b operates the display-associated hardware 108 according to the drawing command to execute the drawing operation. After completion of the drawing operation, the part of the thread execution state information 107 associated with the associated thread 106a or 106b is set at its idle state, at which stage a series of operations over the drawing request from the client program 101 are terminated.

Figure 2:
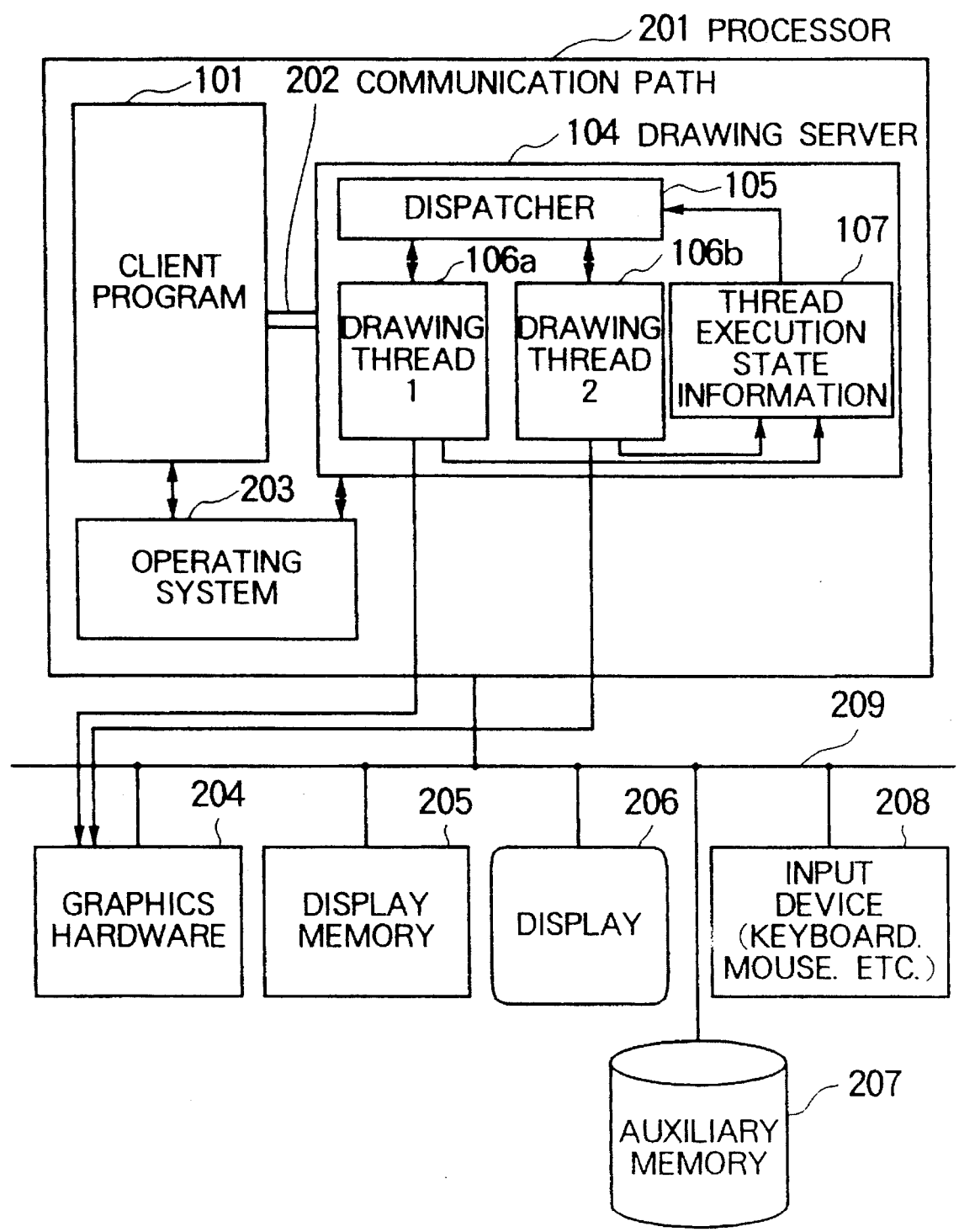
FIG. 2 is a block diagram showing a schematic arrangement of a drawing processing system in accordance with an embodiment of the present invention.

Shown in FIG. 2 is a block diagram of a schematic arrangement of a drawing processing system in accordance with an embodiment of the present invention, in which a processor unit including a processor and a main memory is denoted by reference numeral 201. Operated on the processor 201 are the client program 101, drawing server 104 and an operating system (which will be referred to as the OS, hereinafter). The thread execution state information 107 is stored in a main storage region of the processor 201. The communication path 202, which is implemented by an interprocess communication function or the like of the OS 203, is used to transmit a drawing command from the client program 101 to the drawing server 104 therethrough.

In FIG. 2, the client program 101 and the drawing server 104 are built in the same processor. However, the communication path 202 may be set on a network to allow the client program and drawing server to be built in respectively different processors, which will be explained later. In the drawing, graphics hardware for performing binary/multivalue conversion or the like is denoted by reference numeral 104, a display memory (frame buffer) for storing therein data to be displayed on a real display screen is denoted by 205, and a display for actually displaying thereon contents of the display memory is denoted by 206. A controller for expanding the contents of the display memory 205 is assumed to be included in the display 206. An auxiliary memory such as a magnetic disk unit is denoted by numeral 207 and an input device such as a keyboard or a mouse is denoted by numeral 208. These devices are interconnected by means of buses.

Here is a flow of the drawing operations. In FIG. 2, since the drawing threads 106a and 106b are built in the single processor, only one of these threads is operated at any time.

Figure 14:
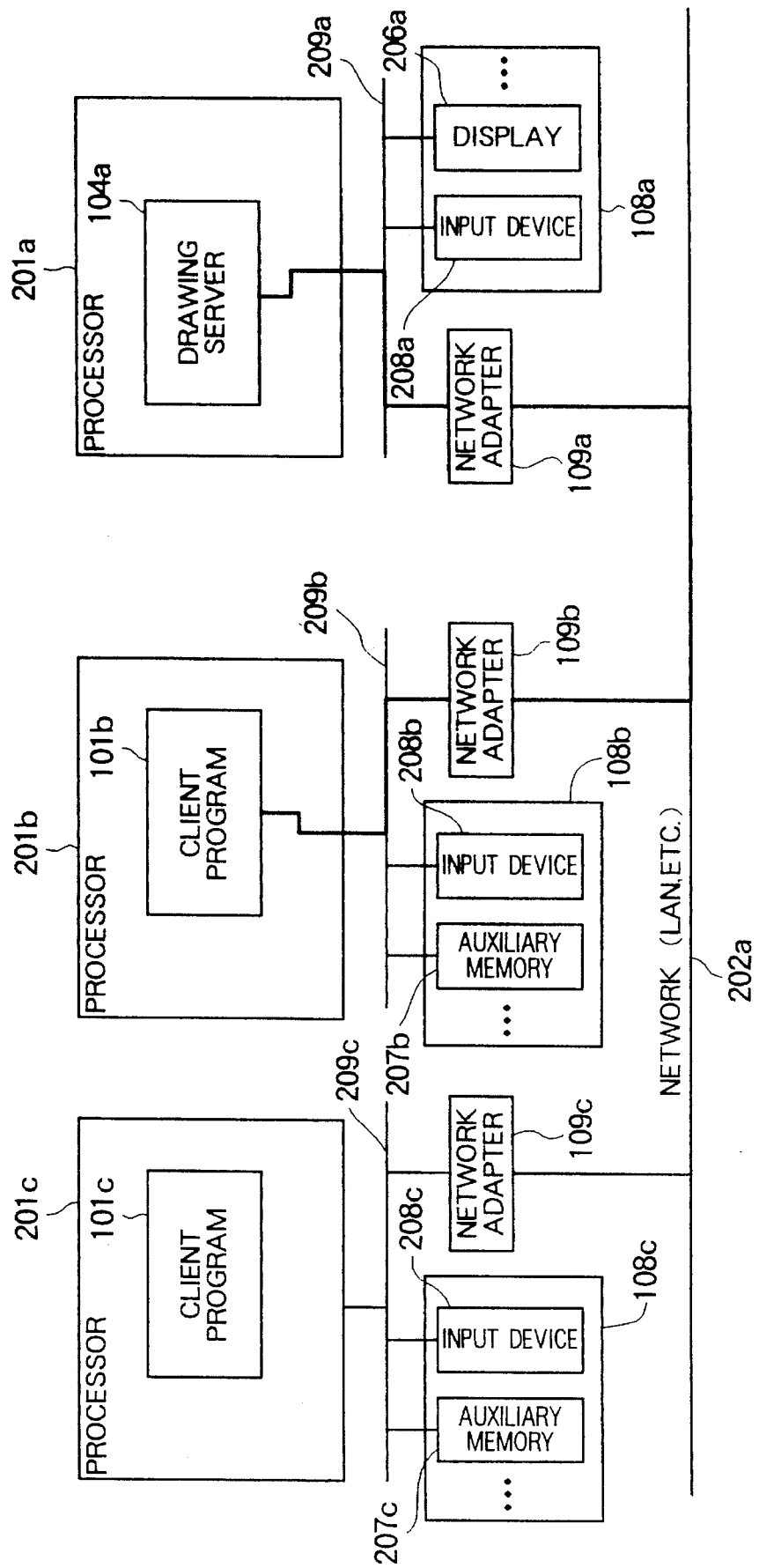
FIG. 14 is a schematic block diagram of an embodiment when the present invention is applied to processors connected to a network.

FIG. 14 shows a drawing processing system in which clients and a drawing server are built in respectively different processors so that communication paths connecting both of the clients and server are set on a network.

In FIG. 14, more specifically, a drawing server 104a is built in a processor 201a, a client 101b is built in a processor 201b, and a client 101c is built in a processor 201c, respectively. The processor 201a has a bus 209a which in turn is connected with a group of hardware devices 108a including an input device 208a, a display 206a and the like and also with a network adapter 109a. Similarly, the processor 201b has a bus 209b which in turn is connected with a group of hardware devices 108b including an input device 208b, an auxiliary memory 207b and the like and also with a network adapter 109b. Still similarly, the processor 201c has a bus 209c which in turn is connected with a group of hardware devices 108c including an input device 208c, an auxiliary memory 207c and the like and also with a network adapter 109c. The processors 201a, 201b and 201c are connected through the network adapters 109a, 109b and 109c to such a network 202a as, for example, a local area network (LAN), respectively. When it is desired for the client 101b to send a drawing command to the drawing server 104a for example, there is established between the client 101b and drawing server 104a such a communication path of the bus 209b, network adapter 109b, network 202a, network adapter 109a and bus 209a, as shown by a thick line in FIG. 14. The drawing server draws a graphics output indicative of the drawing command on the display screen of the display 206a.

Figure 3:
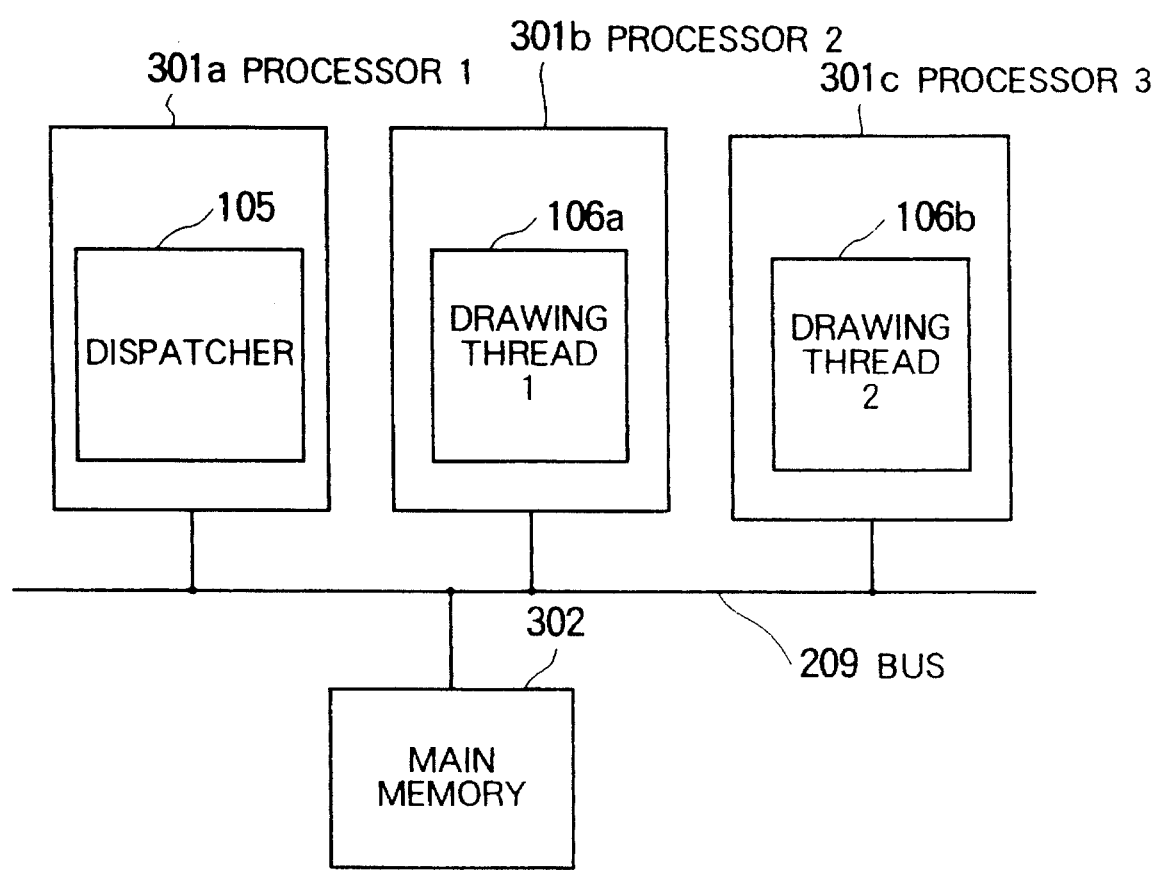
FIG. 3 is a block diagram of an arrangement of a multiprocessor system employed as a processor system of FIG. 2.

Referring to FIG. 3, there is shown a block diagram of an arrangement of a multiprocessor system which includes a plurality of processors in place of the processor 201 including the drawing server 104. More in detail, the multiprocessor system includes 3 of a first processor 301a, a second processor 301b and a third processor 301c, a main memory 302, which are all connected to a bus 209. The main memory 302 is used to store therein programs and data to be accessed by the processors 301a, 301b and 301c. Although the main memory 302 is arranged to be shared by the 3 processors 301a, 301b and 301c in the illustrated example, such a memory may be locally disposed in the respective processors if desired.

Since the dispatcher 105, drawing thread 106a and drawing thread 106b are operated on the first processor 301a, second processor 301b and third processor 301c respectively independently, drawing operation can be realized actually on a parallel basis at any time.

Figure 4A:
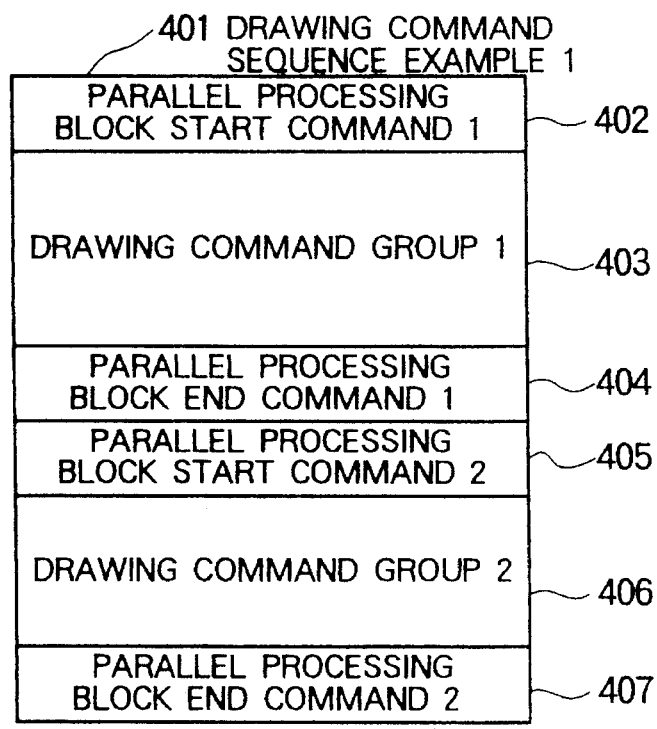
FIGS. 4A and 4B show an example of a sequence of drawing commands transmitted from a client side to a drawing server.
Figure 4B:
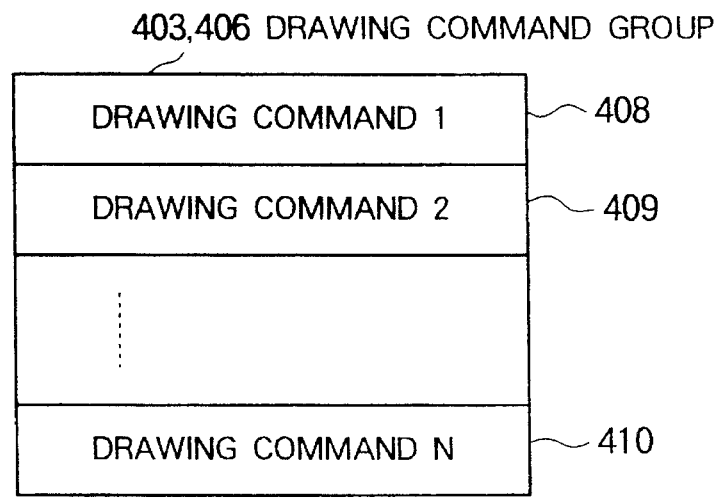

FIG. 4A shows an example 401 of a drawing command sequence transmitted from a client to a drawing server. Explanation will be made as to contents of the drawing command sequence example 401. Numeral 402 denotes a parallel processing block start command 1 which indicates that commands subsequent to this command are parallelly processable. The parallel processing block start command is added on the client side because parallel processability can be more easily judged by the client rather than by the drawing server. In this connection, since the drawing command sequence can be set to include a plurality of parallel processing block start commands, commands are denoted by numbers for the sake of explanation convenience, such as the parallel processing block start command 1 402 which appears first is denoted as attached with a number 1 in the illustrated example. This rule is applied even to commands other than the command 1 402 for discrimination of the types thereof. A drawing command group 1 403 is a string of drawing commands denoted by numerals 408 to 410 as shown in FIG. 4B. A parallel processing block end command 1 404 indicates that the preceding commands can be processed on a parallel basis, at which stage one parallel processing block is designated.

The parallel processing block end command 404 indicates the end of the string of parallelly processable commands. For this reason, there exists a sequential relationship between the subsequent commands and the commands of the above block. Thus, this means that, when it is desired to execute the subsequent commands, it is necessary to wait for the completion of execution of the commands previously started.

This also means that n of the drawing commands of from a drawing command 1 408 of the drawing command group 1 403 enclosed by the parallel processing block start and end commands 1 402 and 403 to a drawing command n 410 can be processed by a plurality of threads on a parallel basis. A parallel processing block start command 2 405, a drawing command group 2 406, and a parallel processing block end command 2 407 indicate a second parallel processing block. In the drawing command sequence example 401, the 2 parallel processing blocks are continuous so that the first drawing command group 403 and the second drawing command group 406 must be sequentially processed.

Figure 5:
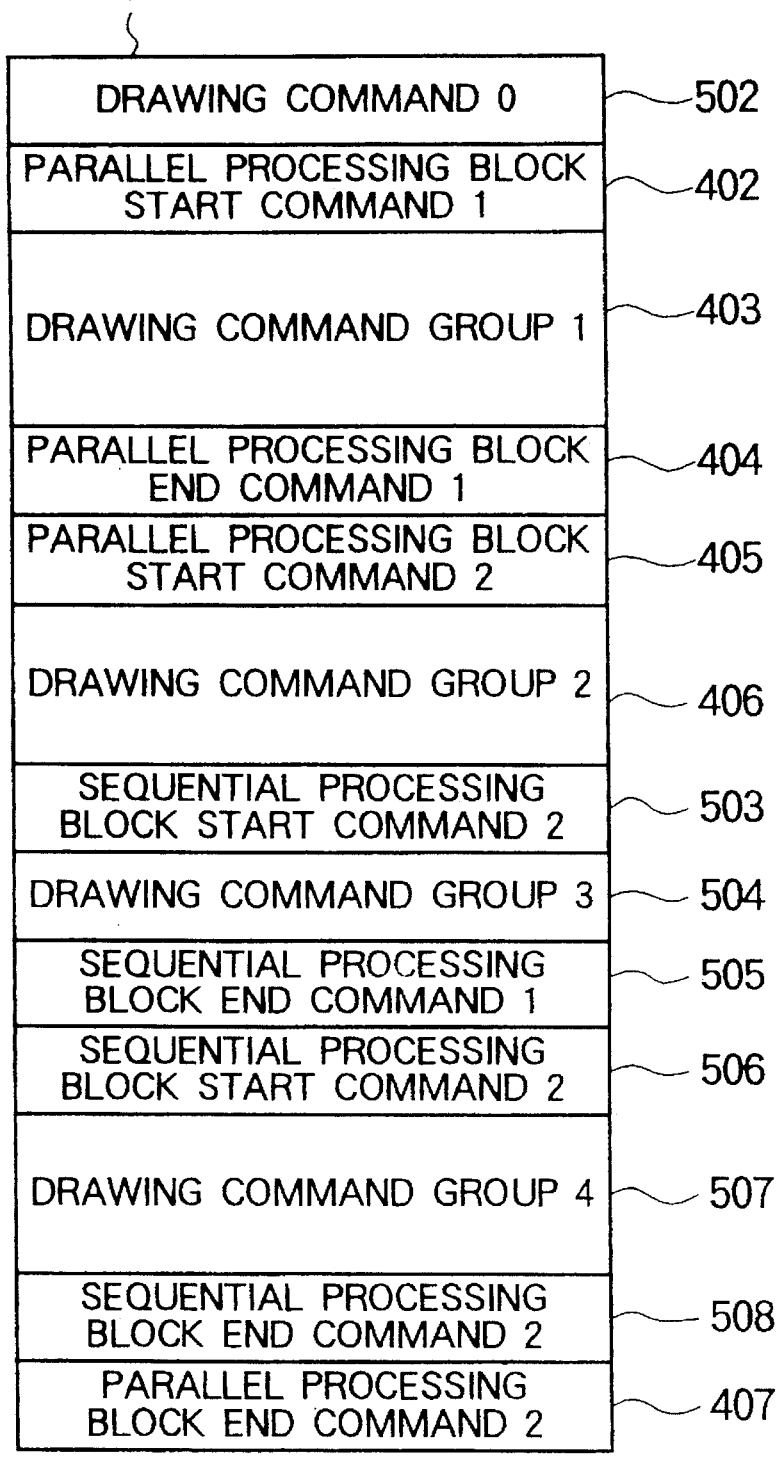
FIG. 5 is another example of the drawing command sequence transmitted from the client side to the drawing server.

Turning now to FIG. 5, there is shown a second example 501 of a sequence of drawing commands including parallel processing blocks and sequential processing blocks. Explanation will be made as to contents of the second drawing command sequence example 501. More specifically, the second drawing command sequence example 501 corresponds to the second parallel processing block of the first drawing command sequence example 401 but including 2 sequential processing blocks. A sequential processing block start command 1 503 indicates that commands subsequent to this commands are impossible to be processed in parallel. Numeral 504 denotes a drawing command group 3 which is made up of a plurality of drawing commands, and 505 denotes a sequential processing block end command 1 which indicative that the commands of the drawing command group 3 504 preceding the sequential processing block end command 1 505 cannot be processed on the parallel basis.

The above operations designate one sequential processing block, which means that any number of commands in the drawing command group 3 504 sandwiched by the sequential processing block start command 1 503 and the sequential processing block end command 1 505 cannot be processed on the parallel basis. Numeral 506 denotes a sequential processing block start command 2 and 507 denotes a sequential processing block end command 2. Through the above operations, the second sequential processing block is specified.

As mentioned above, the second parallel processing block in the second drawing command sequence example 501 is made up of the drawing command group 2 406, the first sequential processing block (503, 504 and 505), and the second sequential processing block (506, 507 and 508) so that the commands in each of the sequential processing blocks cannot be processed on the parallel basis.

However, the drawing commands in the drawing command group 2 406, the 2 sequential processing blocks 503 and 505 or 506 and 508 can be processed on the parallel basis. Numeral 502 denotes a drawing command 0. The second drawing command sequence example 501 indicates that the drawing command 0 502, the first parallel processing block (402, 403 and 404) and the second parallel processing block (405, 406, 503, 504, 505, 506, 507, 508 and 407) are such sequential processing blocks that cannot be processed on the parallel basis. That is, drawing commands and blocks not contained in the parallel and sequential processing blocks are handled as if they were within a sequential processing block.

FIG. 6 shows an example of a program for generating the drawing command sequence in FIG. 4A on the side of a client, and FIG. 7 shows an example of a program for generating the drawing command sequence of FIG. 5. The client 101 generates the drawing command sequences of FIGS. 4 and 5 through such application programs as shown in FIGS. 6 and 7.

Explanation will next be made as to the processing procedure of the dispatcher 105 in the drawing server 104. As mentioned above, the dispatcher 105 reads out a drawing command from the client program 101 and interprets it to cause one of the drawing processing threads 106a and 106b to execute the drawing command.

Figure 8:
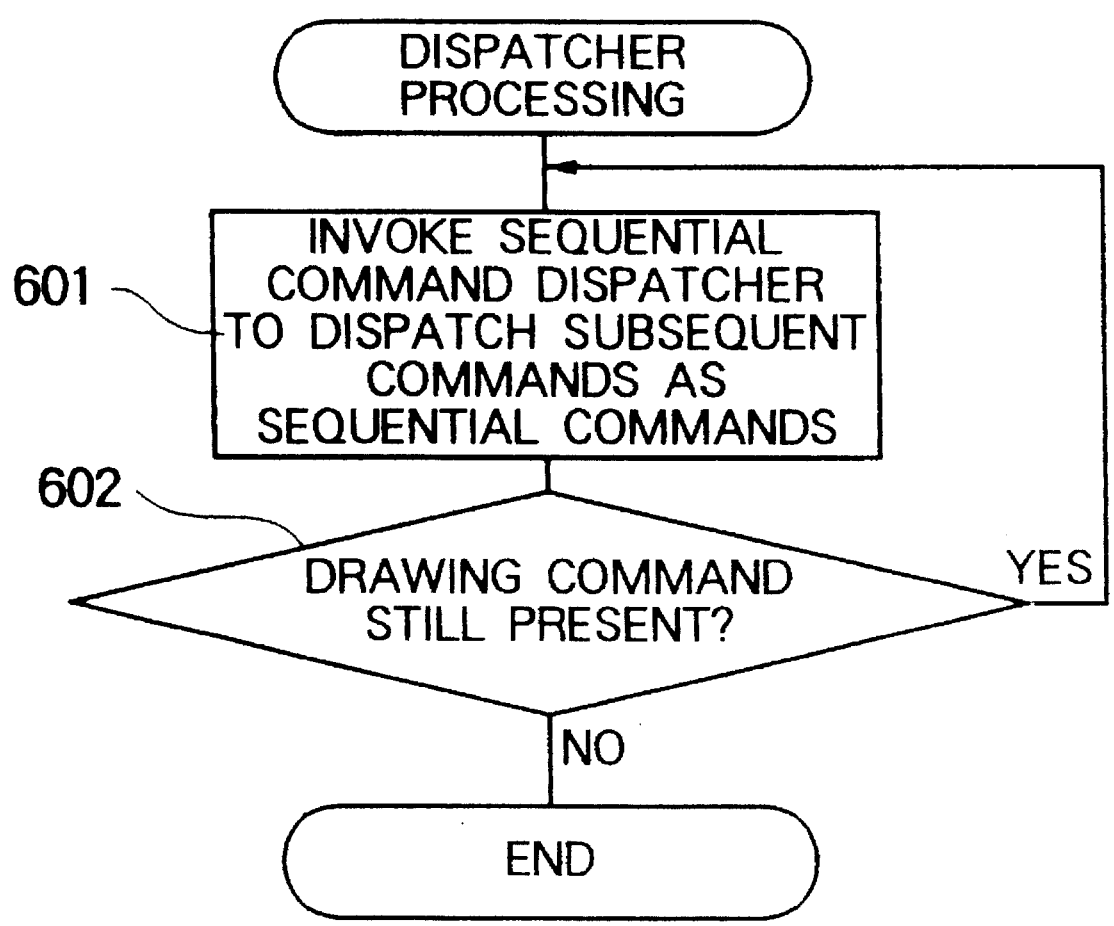
FIG. 8 is a flowchart showing the processing procedure of an uppermost part of dispatch processing of the drawing server with respect to the drawing command sequence transmitted from one client in the present embodiment.

Shown in FIG. 8 is a flowchart for explaining the processing procedure of the uppermost level part of dispatching operation of the drawing server 104 with respect to the drawing command sequence transmitted from one client 101 in the present embodiment. More specifically, a sequential command dispatcher is invoked or called to process the subsequent commands as sequential processing block commands at a step 601. After returning from the sequential command dispatcher, the system judges at a step 602 whether or not the drawing command from the client is still present. If a result of the step 602 is "YES", then the system returns to the step 601. If a result of the step 602 is "NO", then this means the end of the drawing request from the client program 101 and the system terminates the dispatching operation to the target client 101.

Figure 9:
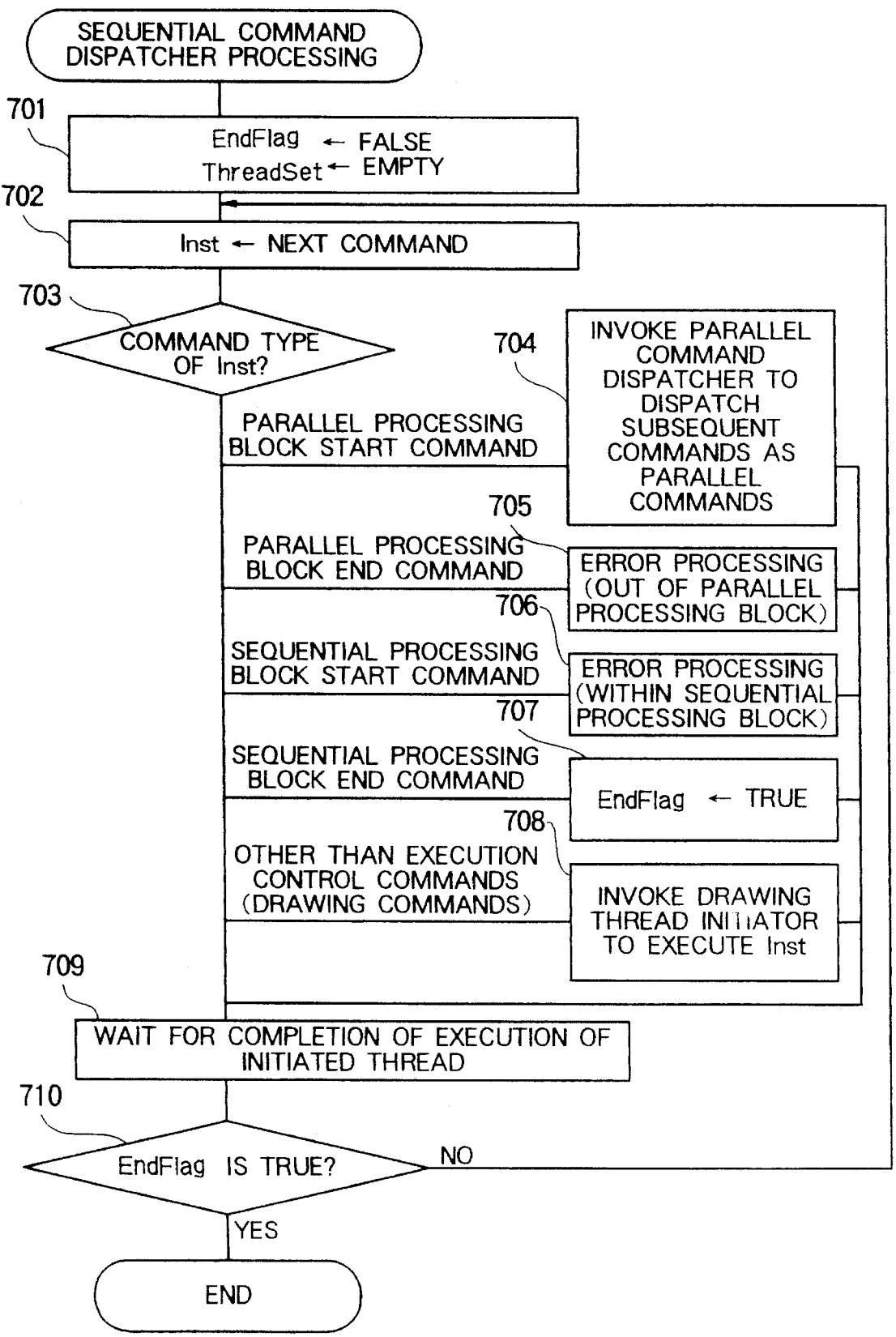
FIG. 9 is a flowchart for explaining the processing procedure of sequential command dispatcher routine in the present embodiment.

FIG. 9 is a flowchart for explaining the processing procedure of a sequential command dispatcher routine in the present embodiment. More in detail, local variables of the sequential command dispatcher routine are initialized at a step 701, and more concretely, a variable EndFlag indicative of termination of a dispatching loop in the routine is set at 'False' and a variable ThreadSet indicative of a drawing thread being initiated in the routine is set at 'Empty'. The variable ThreadSet is expressed in the form of a table in which all the drawing threads 106a and 106b being initiated are registered. At a step 702, a next drawing command is read out from the target client 101 to be set as a variable Inst. At a subsequent step 703, the command type is determined. As a result of the step 703, when the variable Inst is of a parallel processing block start command, the system proceeds to a next step 704 and invokes the parallel command dispatcher to process the subsequent commands as ones of a parallel processing block.

When the variable Inst is determined to be of a parallel processing block end command as a result of the step 703, the system goes to a step 705 to be processed as an out-of-parallel-processing-block error. When the variable Inst is determined to be of a sequential processing block start command at the step 703, the system goes to a step 706 to be processed as an in-sequential-processing-block error. When the variable Inst is determined to be of a sequential processing block end command at the step 703, the system proceeds to a step 707 and sets the variable EndFlag at "True" to indicate the end of the dispatching loop. When it is determined at the step 703 that the variable Inst is not of any of the above execution control commands (which refer to 4 of the parallel processing block start command, parallel processing block end command, sequential processing block start command and sequential processing block end command), the system goes to a step 708 and invokes a drawing processing block thread initiator to execute the drawing command Inst.

When the drawing thread 106a or 106b is initiated in the steps from 703 to 708, the thread is registered in a variable Thread. At a step 709, the system waits until the drawing thread 106a or 106b designated by the variable ThreadSet and activation-started by the routine completes its processing, after which the variable Thread in question is erased from the variable ThreadSet.

Subsequently, the system goes to a step 710 to judge whether or not the variable EndFlag is at 'True'. If it is determined at the step 710 that the judgement is "N", then the system goes to the step 702 to repeat the dispatching operation of the sequential command. If the result of the step 710 is "YES", then this means the end of one sequential processing block, so that the system returns to the place where the routine was invoked to terminate the dispatching operation of the routine.

Figure 10:
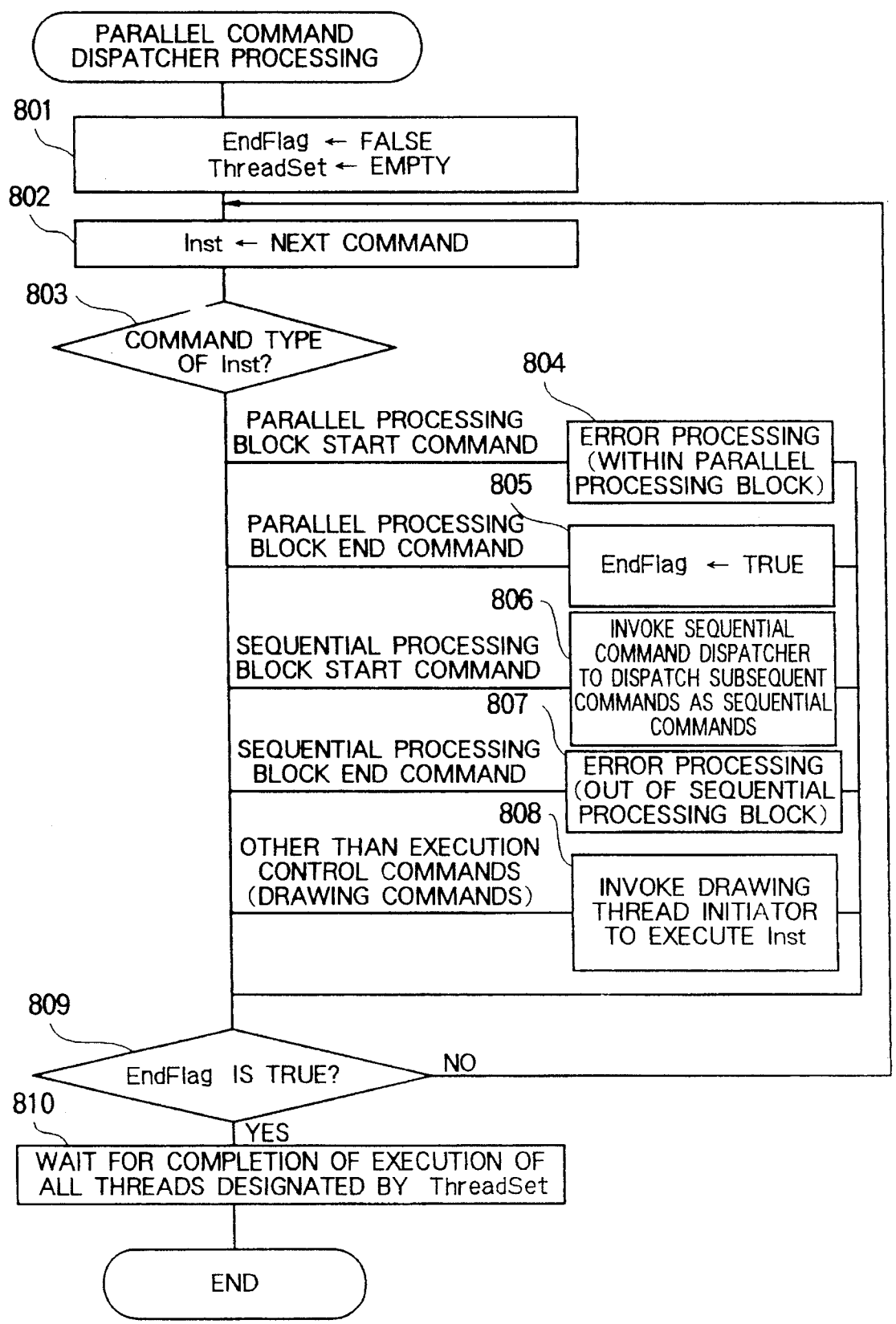
FIG. 10 is a flowchart for explaining the processing procedure of a parallel command dispatcher routine in the present embodiment.

FIG. 10 is a flowchart for explaining the processing procedure of a parallel command dispatcher routine in the present embodiment. More concretely, at a step 801, local variables of the parallel command dispatcher routine are initialized. That is, the variable EndFlag indicative of termination of a dispatching loop in the routine is set at 'False' and the variable ThreadSet indicative of a drawing processing thread being initiated in the routine is set at 'Empty'. At a step 802, a next drawing command is read out from the target client 101 to be set as a variable Inst. At a subsequent step 803, the type of the command is determined. As a result of the step 803, when the variable Inst is of a parallel processing block start command, the system proceeds to a next step 804 and to process the parallel processing block start command as an in-parallel-processing-block error. When the variable Inst is determined at the step 803 to be of a parallel processing block end command, the system goes to a step 805 to set the variable EndFlag at 'True' to indicate the termination of the dispatching loop. When the variable Inst is determined at the step 803 to be of a sequential processing block start command, the system goes to a step 806 and invokes a sequential command dispatcher to process the subsequent commands as ones of the sequential processing block. When the variable Inst is determined at the step 803 to be of a sequential processing block end command, the command is processed as an out-of-sequential-processing-block error. When it is determined at the step 803 that the variable Inst is not of any of the above execution control commands, the system goes to a step 808 and invokes a drawing thread initiator to execute the drawing command Inst.

Following a series of the steps 803 to 808, the system proceeds to a step 809 to judge whether or not the variable EndFlag is 'True'. If the result of the step 809 is "NO", then the system goes to the step 802 to repeat the dispatching operation of the parallel command. If the result of the step 809 is "YES", then the system proceeds to a step 810 and waits until the drawing thread 106a or 106b designated by the variable ThreadSet and activation-started by the routine completes its processing, after which the variable Thread in question is erased from the variable ThreadSet.

With the above operations, one parallel processing block is terminated, so that the system returns to the place where the routine was invoked to terminate the dispatching operation of the routine.

Figure 11:
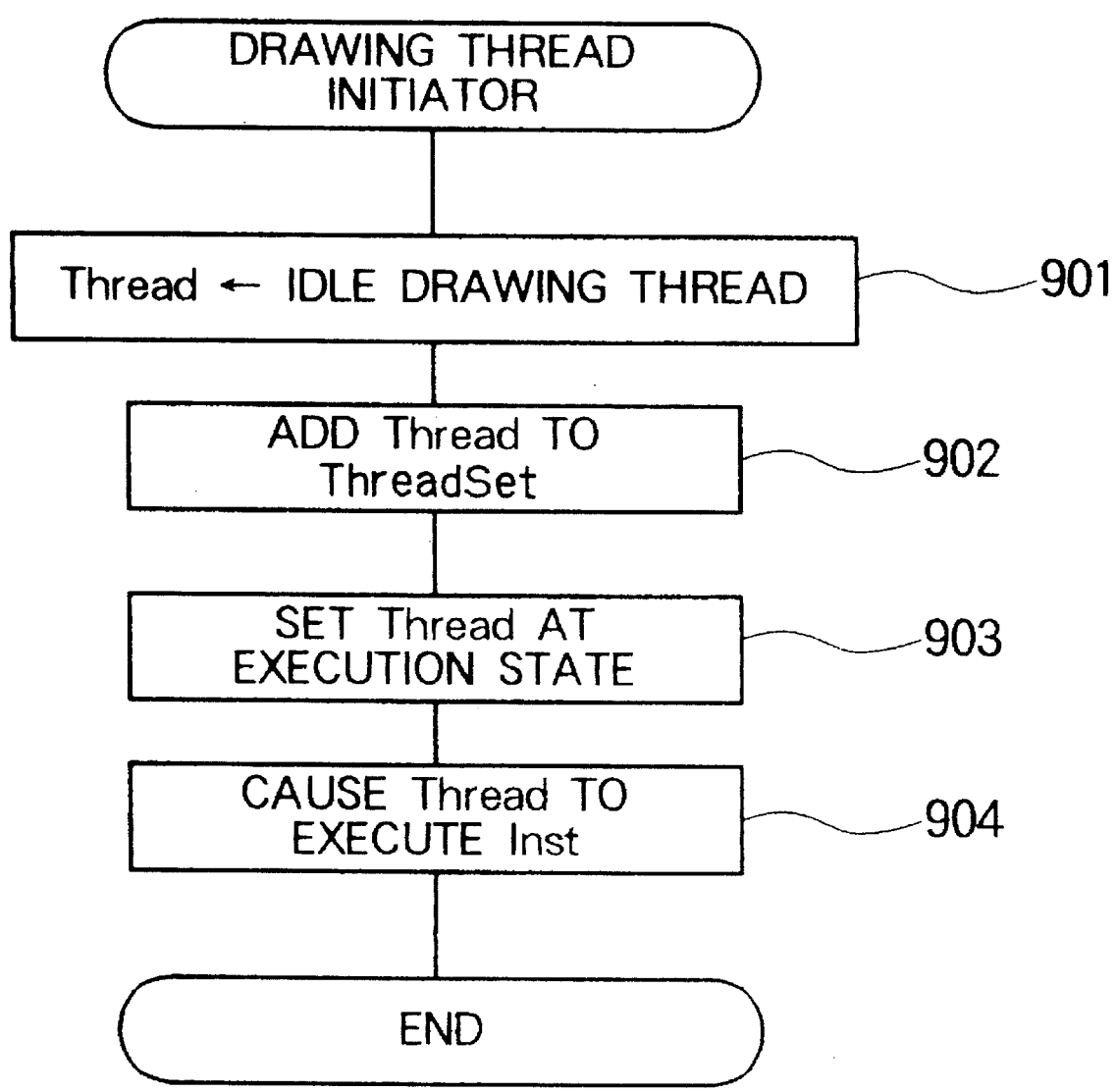
FIG. 11 is a flowchart for explaining the procedure of a drawing thread initiator in the present embodiment.

FIG. 11 is a flowchart for explaining the processing procedure of the drawing thread initiator of the step 708 or 808 in the present embodiment. The drawing thread initiator is assumed to be able to refer to the variables Inst and ThreadSet of the routine for executing the initiator. At a step 901, the system retrieves the thread execution state information 107, selects one of the drawing threads 106a and 106b which is in the idle state, and sets the associated thread 106a or 106b for the variable Thread.

At a step 902, the variable Thread is added to the variable ThreadSet of the routine. At a step 903, the thread execution state information 107 is set in its execution state. In a next step 904, the drawing thread 106a or 106b specified by the variable Thread is initiated to execute the command Inst. The operation of the drawing thread 106a or 106b initiated at the step 904 is branched from the operation of the dispatcher 105 and executed on the parallel basis.

Figure 12:
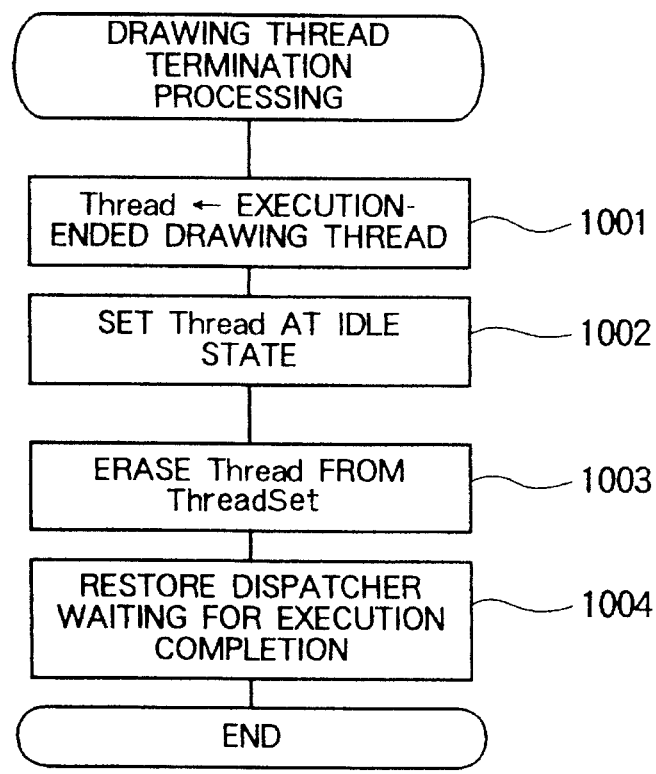
FIG. 12 is a flowchart for explaining the procedure of termination of the drawing thread in the present embodiment.
Figure 13:
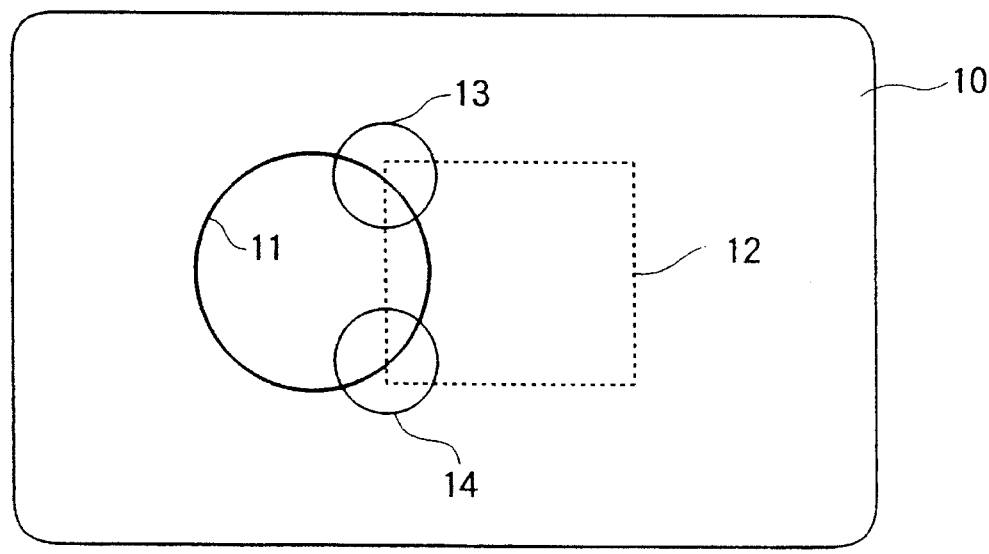
FIG. 13 is a diagram for explaining an incorrect display caused by command execution overtaking.

Shown in FIG. 12 is a flowchart for explaining the processing procedure of termination of a drawing thread in the present embodiment, which is started after the drawing thread branched from the step 904 completes execution of one drawing command. More in detail, at a step 1001, the target drawing thread 106a or 106b after completing the command execution is set for the variable Thread. At a step 1002, the thread execution state information 107 of the variable Thread is set at its idle state and at a step 1003, the variable Thread is erased from the variable ThreadSet. At a subsequent step 1004, the dispatcher waiting for the completion of execution of the drawing thread in question at the step 709 or 809 is restored. At this stage, a series of drawing command dispatching operations have been completed.

In the foregoing embodiment, since the client program acts to add the parallel processing block start and end commands indicative of the start and end of a string of drawing commands parallelly executable or the sequential processing block start and end commands indicative of the start and end of a string of drawing commands parallelly unexecutable, the drawing server can easily detect a string of drawing commands executable on the parallel basis.

Although the present invention has been explained in detail in connection with the preferred embodiment in the foregoing, it goes without saying that the invention is not limited to the specific embodiment but may be modified in various ways without departing from the subject matter and spirit of the attached claims.

What is claimed is:

1. A drawing processing system comprising:
   a client for sending a drawing command string including a plurality of drawing commands according to a predetermined protocol;
   a drawing server for receiving said drawing command string and providing graphics display on a display screen of a display; and
   a communication path connected between said client and said drawing server,
   wherein said client includes a drawing command execution control mechanism for attaching to said drawing command string a predetermined command indicative of whether a subsequent command string is to be processed on a parallel or sequential basis and for transmitting the attached predetermined command to said drawing server, and said drawing server includes execution control determination means, when receiving said drawing command string, for judging on the basis of said predetermined command whether to process the subsequent drawing command string on the parallel or sequential basis.

2. A drawing processing system as set forth in claim 1, wherein said drawing server has a plurality of drawing threads for executing the respective drawing commands, and said drawing command execution control mechanism in said drawing server includes a dispatcher connected to said plurality of drawing threads for allocating commands of said subsequent command string to said plurality of drawing threads in response to said predetermined command indicating that the subsequent command string can be processed on the parallel basis.

3. A drawing processing system as set forth in claim 2, wherein said drawing server includes a plurality of processors for processing operations of said drawing threads respectively.

4. A drawing processing system as set forth in claim 2, wherein said dispatcher and said plurality of drawing threads are built in a plurality of processors connected by means of a bus respectively.

5. A drawing processing system as set forth in claim 1, wherein said client and said drawing server are built in an identical processor.

6. A drawing processing system as set forth in claim 1, wherein said client and said drawing server are built in respectively different processors, and said different processors are interconnected by means of a network as said communication path.

7. A drawing processing system compromising:
   a client for sending a drawing command string including a plurality of drawing commands according to a predetermined protocol;
   a drawing server for receiving said drawing command string and providing graphics display on a display screen of a display; and
   a communication path connected between said client and said drawing server,
   wherein said client includes a drawing command execution control mechanism for attaching to at least one said drawing command string a pair of a parallel processing block start command indicative of start of the drawing command string parallelly executable and a parallel processing block end command indicative of end of the parallelly-executable drawing command string and for transmitting the attached command string to said drawing server, and said drawing server includes execution control determination means, when receiving said drawing command string, for processing a subsequent drawing command string on the parallel basis in response to said parallel processing block start command and for processing the subsequent drawing command string on the sequential basis in response to said parallel processing block end command.

8. A drawing processing system as set forth in claim 7, wherein said drawing server has a plurality of drawing threads for executing the respective drawing commands, and said drawing command execution control mechanism in said drawing server includes a dispatcher connected to said plurality of drawing threads for allocating commands of said subsequent command string to said plurality of drawing threads until said dispatch accepts said parallel processing block end command in response to said parallel processing block start command.

9. A drawing processing system as set forth in claim 8, wherein said dispatcher includes a parallel command dispatcher for executing and controlling the drawing command string sandwiched by said pair of said parallel processing start and end commands on the parallel basis as well as a sequential command dispatcher for executing and controlling a drawing command string other than the sandwiched command string on the sequential basis.

10. A drawing processing system as set forth in claim 8, wherein said drawing server includes a plurality of processors for processing operations of said drawing threads respectively.

11. A drawing processing system as set forth in claim 8, wherein said dispatcher and said plurality of drawing threads are built in a plurality of processors connected by means of a bus respectively.

12. A drawing processing system as set forth in claim 7, wherein said drawing command execution control mechanism in said client attaches to at least one said drawing command string a pair of a sequential processing block start command indicative of start of drawing command string to be processed on a sequential basis and a sequential processing block end command indicative of end of the drawing command string to be processed on the sequential basis, with said pair provided between said pair of said parallel processing block start and end commands, and said execution control determination means in said drawing server, when receiving said drawing command string, performs drawing operation over the entire drawing command string between said sequential processing block start and end commands as a single parallel processing block.

13. A drawing processing system as set forth in claim 12, wherein said dispatcher includes a parallel command dispatcher for executing and controlling the drawing command string sandwiched by said pair of said parallel processing start and end commands on the parallel basis as well as a sequential command dispatcher for executing and controlling a drawing command string other than the sandwiched command string or drawing command string sandwiched by said pair of said sequential processing start and end commands on the sequential basis.

14. A drawing processing system as set forth in claim 7, wherein said client and said drawing server are built in an identical processor.

15. A drawing processing system as set forth in claim 7, wherein said client and said drawing server are built in respectively different processors, and said different processors are interconnected by means of a network as said communication path.

* * * * *